(12) United States Patent
Kamata

(10) Patent No.: US 9,496,743 B2
(45) Date of Patent: Nov. 15, 2016

(54) POWER RECEIVING DEVICE AND WIRELESS POWER FEED SYSTEM

(75) Inventor: Koichiro Kamata, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1221 days.

(21) Appl. No.: 13/207,474

(22) Filed: Aug. 11, 2011

(65) Prior Publication Data

US 2012/0062174 A1 Mar. 15, 2012

(30) Foreign Application Priority Data

Sep. 13, 2010 (JP) ................................ 2010-203874

(51) Int. Cl.
*H02J 7/00* (2006.01)
*H02J 7/02* (2016.01)
*H04B 5/00* (2006.01)

(52) U.S. Cl.
CPC .................. *H02J 7/025* (2013.01); *H04B 5/00* (2013.01); *H04B 5/0012* (2013.01)

(58) Field of Classification Search
CPC ........ H02J 7/025; H04B 5/00; H04B 5/0012
USPC ......................................... 320/108; 455/41.1
See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 5,757,036 A * | 5/1998 | Temple | 257/147 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |

(Continued)

FOREIGN PATENT DOCUMENTS

| | | |
|---|---|---|
| CN | 101401312 A | 4/2009 |
| CN | 101416411 A | 4/2009 |

(Continued)

OTHER PUBLICATIONS

Fortunato.E et al., "Wide-Bandgap High-Mobility ZNO Thin-Film Transistors Produced at Room Temperature,", Appl. Phys. Lett. (Applied Physics Letters) , Sep. 27, 2004, vol. 85, No. 13, pp. 2541-2543.

(Continued)

*Primary Examiner* — Nathaniel Pelton
(74) *Attorney, Agent, or Firm* — Eric J. Robinson; Robinson Intellectual Property Law Office, P.C.

(57) ABSTRACT

An electric field coupling type wireless power feed system including a power transmitting device and a power receiving device which is unlikely to be affected by a noise and which has a reduced size is provided. A capacitive coupling type wireless power feed system includes a power receiving device including a first electrode using an oxide semiconductor film, and a battery and a power transmitting device including a second electrode, wherein the battery is charged by a voltage generated based on an electric field generated between the first electrode and the second electrode. The charging of the battery may be stopped by applying a positive direct-current voltage from a charge control circuit to the first electrode.

11 Claims, 7 Drawing Sheets

(56) References Cited

U.S. PATENT DOCUMENTS

| | | |
|---|---|---|
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,812,771 B2 | 10/2010 | Greene et al. |
| 7,859,525 B2 | 12/2010 | Takatori et al. |
| 8,134,545 B2 | 3/2012 | Takatori et al. |
| 8,174,047 B2 | 5/2012 | Fukuoka et al. |
| 8,242,638 B2 | 8/2012 | Camurati et al. |
| 8,253,390 B2 | 8/2012 | Yao et al. |
| 8,436,842 B2 | 5/2013 | Takatori et al. |
| 8,587,156 B2 | 11/2013 | Camurati et al. |
| 8,587,157 B2 | 11/2013 | Camurati et al. |
| 8,729,738 B2 | 5/2014 | Camurati et al. |
| 8,772,978 B2 | 7/2014 | Ichikawa et al. |
| 8,860,081 B2 | 10/2014 | Fukuoka et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0182367 A1* | 8/2007 | Partovi ............ 320/108 |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0076351 A1* | 3/2008 | Washiro ............ 455/41.1 |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0252254 A1* | 10/2008 | Osada ............ 320/108 |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2008/0308143 A1* | 12/2008 | Atanackovic ............ 136/255 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0206675 A1* | 8/2009 | Camurati et al. ............ 307/104 |
| 2009/0278122 A1 | 11/2009 | Hosono et al. |
| 2009/0280600 A1 | 11/2009 | Hosono et al. |
| 2009/0302690 A1 | 12/2009 | Kubono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0031821 A1 | 2/2011 | Greene et al. |
| 2011/0234019 A1 | 9/2011 | Camurati et al. |
| 2012/0146431 A1* | 6/2012 | Ichikawa et al. ............ 307/149 |
| 2014/0103716 A1 | 4/2014 | Camurati et al. |

FOREIGN PATENT DOCUMENTS

| | | |
|---|---|---|
| CN | 101803222 A | 8/2010 |
| EP | 1737044 A | 12/2006 |
| EP | 2226847 A | 9/2010 |
| EP | 2400633 A | 12/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-214405 A | 8/1996 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-079786 | 3/2005 |
| JP | 2007-272203 A | 10/2007 |
| JP | 2008-278616 | 11/2008 |
| JP | 2009-531009 | 8/2009 |
| JP | 2010-041042 A | 2/2010 |
| JP | 2012-029548 A | 2/2012 |
| WO | WO-2004/114391 | 12/2004 |
| WO | WO-2007/107642 | 9/2007 |
| WO | WO-2007/108819 | 9/2007 |
| WO | WO-2008/024078 | 2/2008 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

(56) References Cited

OTHER PUBLICATIONS

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15TH International Display Workshops, Dec. 3, 2008, pp. 1637-1640.

Hayashi.R et al., "42.1: Invited Paper: Improved Amorphous In—Ga—Zn—O TFTS,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3—Ga2ZnO4—ZnO system at 1350° C,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Backplane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTS,", IDW '09 : Proceedings of the 16th International Display Workshops, 2009, pp. 689-692.

Park.J et al., "Amorphous Indium—Gallium—Zinc Oxide TFTS and Their Application for Large Size AMOLED,", AM-FPD '08 Digest of Technical Papers, Jul. 2, 2008, pp. 275-278.

Parks et al., "Challenge to Future Displays: Transparent AM-OLED Driven by PEALD Grown ZNO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZNO TFTS) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 in. QVGA AMOLED Display Using In—Ga—Zn—Oxide TFTS With a Novel Passivation Layer,", SID Digest '09 : SID International Symposium Digest of Technical Papers, May 31, 2009, pp. 284-287.

(56) References Cited

OTHER PUBLICATIONS

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663- 666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 1, 2002, vol. 1, pp. 64-68.

Kimizuka.N. et al., "Spinel,YBFE2O4, and YB2FE3O7 Types of Structures for Compounds in the In2O3 and Sc2O3—A2O3—BO Systems [A; Fe, Ga, or Al; B: Mg, Mn, Fe, Ni, Cu,or Zn] At Temperatures Over 1000° C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Chinese Office Action (Application No. 201110284294.1) Dated Aug. 20, 2014.

Shinko Maekawa, "Murata commercializes the capacitive-coupling wireless power transmission, now developing it for iPads. (Part 2)", http://eetimes.jp/ee/articles/1007/05/news094.html, Jul. 5, 2010, p. 5pages.

* cited by examiner

POWER RECEIVING DEVICE AND WIRELESS POWER FEED SYSTEM

BACKGROUND OF THE INVENTION

1. Field of the Invention

The technical field relates to a power receiving device of a capacitive coupling type and a capacitive coupling type wireless power feed system.

2. Description of the Related Art

In recent years, electronic devices using electric power as a prime mover, which are typified by mobile devices such as mobile phones or laptop personal computers, are often used while being carried. In addition, transportation means such as bicycles and automobiles which use electric power as a prime mover have been developed in terms of its cleanness and safety in the aspect of environment.

Electronic devices and transportation means which are used outside the house, for example in a travel destination, or which are used while traveling are difficult to receive electric power constantly with a wire from a commercial power supply distributed to each house. Therefore, portable electronic devices and transportation means incorporate batteries which have been charged from a commercial power supply in advance and operate by receiving electric power from the batteries.

Since the operating time of the electronic device is limited by the amount of power storage of the battery, a user needs to prepare a spare battery or search a commercial power supply in the travel destination by which the battery can be recharged in order to use the electronic device continuously for a long time. In view of the above, a contactless type power feed system has been suggested so that power can be fed to the battery even when there is no commercial power supply.

As the contactless type power feed system, there are an electromagnetic induction type, an electromagnetic wave transmission type, an electromagnetic field resonance type, an electric field coupling type, and the like.

In the electromagnetic induction type, current is fed to one of coils which are adjacent to each other to generate a magnetic flux so that an electromotive force is generated to the other coil via the magnetic flux. In the electromagnetic wave transmission type, supplied electric power is converted into an electromagnetic wave to be transmitted as a microwave or the like via an antenna. In the electromagnetic field resonance type, a resonance phenomenon of an electromagnetic wave is utilized.

Further, in the electric field coupling type, which is also called a capacitive coupling type, each of a device on a power transmitting side and a device on a power receiving side is provided with an electrode and electric power is transmitted utilizing an electric field generated between the electrodes. The electric field coupling type has attracted attention in point of having high transmission efficiency and a relatively wide margin on the position where the device on the power receiving side is located.

As the electric field coupling type power feed system, for example, Patent Document 1 has disclosed an apparatus in which electricity is delivered via an inductive substance. In the apparatus disclosed in Patent Document 1, as shown in FIG. 5, a high-voltage high-frequency generator 501 has one terminal connected to a passive electrode 502 and the other terminal connected to an active electrode 503 (also called "generator electrode"). The active electrode 503 is smaller than the passive electrode 502. Moreover, the active electrode 503 generates a zone 504 as an intense field where energy is concentrated.

A high-voltage high-frequency load 505 is connected on one side to an electrode 506 (also called "electromotive electrode") and on the other side to an electrode 507 (also called "passive electrode"). The electrode 506 is located in the zone 504 as the intense field.

Further, in the electric field coupling type power feed system, a high-frequency noise sometimes causes electrostatic breakdown or malfunction of a power receiving device or a power transmitting device. As the high-frequency noise, for example, electrostatic discharge (ESD), an electromagnetic wave existing in the atmosphere, or the like is given.

Therefore, as a method for suppressing the influence of the high-frequency noise, a power receiving device or a power transmitting device of a power feed system is sometimes provided with a filter for blocking the high-frequency noise.

[Reference]
[Patent Document 1]
Japanese Translation of PCT International Application No. 2009-531009

SUMMARY OF THE INVENTION

When the power receiving device of the power feed system is provided with the filter for blocking the high-frequency noise, the thickness of the power receiving device increases by the thickness of the filter, which makes the power receiving device large.

It is an object of an aspect of the present invention to provide an electric field coupling type wireless power feed system including a power transmitting device and a power receiving device which has a reduced size and which is unlikely to be affected by the noise. It is an object of another aspect of the present invention to provide a power receiving device which has a reduced size, which is unlikely to be affected by the noise, and which is fed with electric power wirelessly utilizing an electric field.

An aspect of the present invention is a capacitive coupling type wireless power feed system including a power receiving device including a first electrode using an oxide semiconductor film and a battery, and a power transmitting device including a second electrode, wherein the battery is charged by a voltage generated based on an electric field generated between the first electrode and the second electrode. Another aspect of the present invention is a power receiving device including a first electrode using an oxide semiconductor film and a battery, wherein the battery is charged by a voltage generated based on an electric field generated between the first electrode and a second electrode of a power transmitting device.

Another aspect of the present invention is a capacitive coupling type wireless power feed system including a power receiving device including a first electrode using an oxide semiconductor film, a battery, and a charge control circuit and a power transmitting device including a second electrode, wherein the battery is charged by a voltage generated based on an electric field generated between the first electrode and the second electrode, and wherein the charging of the battery is stopped by applying a positive direct-current voltage from the charge control circuit to the first electrode. Another aspect of the present invention is a power receiving device including a first electrode using an oxide semiconductor film, a battery, and a charge control circuit, wherein the battery is charged by a voltage generated based on an electric field generated between the first electrode and a second electrode of a power transmitting device, and wherein the charging of the battery is stopped by applying a positive direct-current voltage from the charge control circuit to the first electrode.

The oxide semiconductor film preferably has a sodium concentration of $5\times10^{16}$ atoms/cm$^3$ or less.

Further, the oxide semiconductor film preferably has a hydrogen concentration of $5\times10^{19}$ atoms/cm$^3$ or less.

As the battery, a lithium battery, a nickel-metal-hydride battery, a nickel-cadmium battery, an organic radical battery, a lead-acid battery, an air secondary battery, a nickel-zinc battery, a silver-zinc battery, or a capacitor may be used.

The power receiving device may be provided for a mobile phone, a portable information terminal, a camera, a computer, an image reproduction device, an IC card, or an IC tag.

The power transmitting device may be provided for a charger sheet.

In accordance with an aspect of the present invention, an electric field coupling type wireless power feed system including a power transmitting device and a power receiving device which has a reduced size and which is unlikely to be affected by the noise can be provided. In accordance with another aspect of the present invention, a power receiving device which has a reduced size, which is unlikely to be affected by the noise, and which is fed with electric power wirelessly utilizing an electric field can be provided.

DETAILED DESCRIPTION OF THE INVENTION

Figure 1:
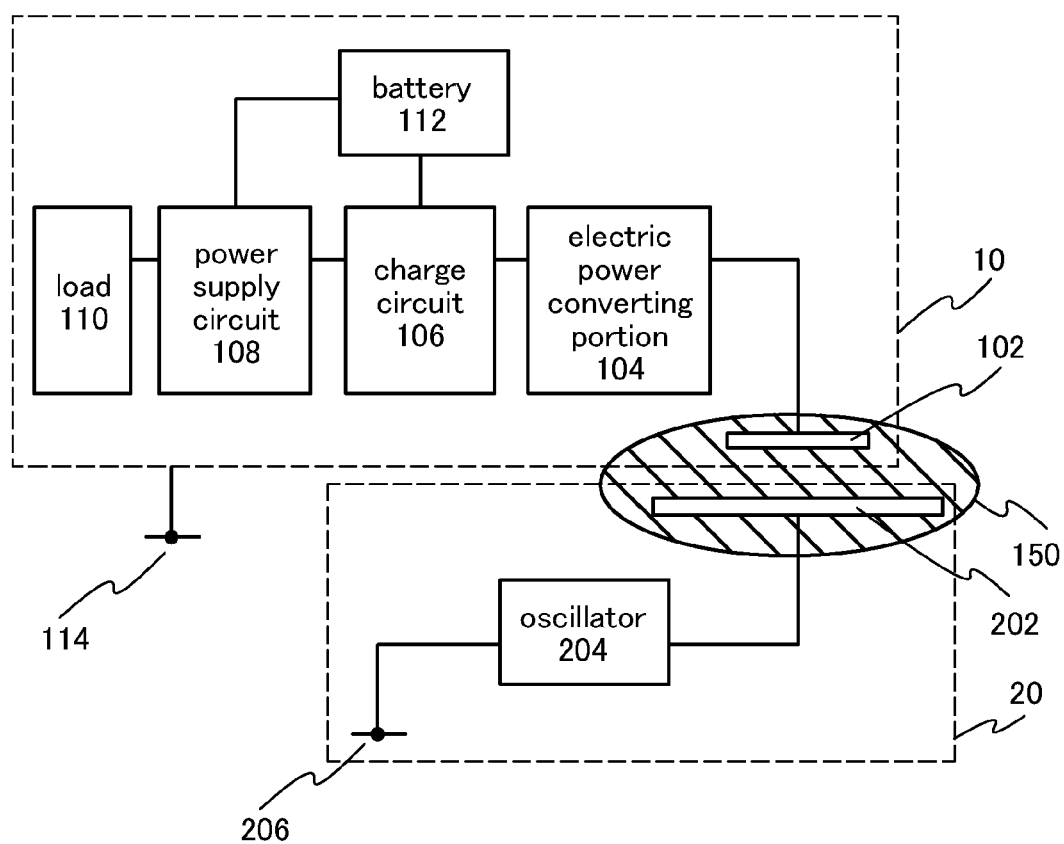
FIG. 1 is for explaining an example of a structure of an electric field coupling type wireless power feed system.

Examples of embodiments of the present invention will be described below with reference to the drawings. Note that the present invention is not limited to the following description because it will be easily understood by those skilled in the art that various changes and modifications can be made without departing from the spirit and scope of the present invention. Therefore, the present invention should not be construed as being limited to the following description. Note that the reference numeral indicating the same part is sometimes used in the different drawings. Further, in some cases, the same hatching patterns are applied to similar parts in the different drawings, and the similar parts are not necessarily designated by reference numerals.

Note that the contents of the embodiments can be combined with or replaced by one another as appropriate.

(Embodiment 1)

Embodiment 1 will describe an electric field coupling type wireless power feed system with reference to FIG. 1.

In the electric field coupling type wireless power feed system, an electric field is generated between an electrode on a power receiving side and an electrode on a power transmitting side by approximating the electrodes to each other and this electric field is utilized for supply of electric power without contact. Here, since capacitance is generated between the electrodes, the electric field coupling type is also called a capacitive coupling type.

FIG. 1 shows an example of a structure of an electric field coupling type wireless power feed system. In the wireless power feed system of FIG. 1, electric power is supplied from a power transmitting device 20 to a power receiving device 10.

The power receiving device 10 includes an electrode 102 on a power receiving side, an electric power converting portion 104, a charge circuit 106, a power supply circuit 108, a load 110, a battery 112, and a wiring 114. The power transmitting device 20 includes an electrode 202 on a power transmitting side, an oscillator 204, and a wiring 206. In FIG. 1, the electric field generated between the electrode 102 on the power receiving side and the electrode 202 on the power transmitting side concentrates on a region 150.

An oxide semiconductor film is used for the electrode 102 on the power receiving side.

An oxide semiconductor used for the oxide semiconductor film includes at least one element selected from In, Ga, Sn, and Zn.

For example, a quarternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide, a ternary metal oxide such as an In—Ga—Zn-based oxide, an In—Sn—Zn-based oxide, an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, or indium oxide, tin oxide, zinc oxide, or the like can be used. Further, any of the above oxides may contain an element other than In, Ga, Sn, and Zn, for example, SiO$_2$.

The oxide semiconductor film is the one from which impurities such as hydrogen have been removed sufficiently and to which oxygen has been supplied sufficiently. Specifically, the concentration of hydrogen of the oxide semiconductor film is $5\times10^{19}$ atoms/cm$^3$ or less, preferably $5\times10^{18}$ atoms/cm$^3$ or less, more preferably $5\times10^{17}$ atoms/cm$^3$ or less.

In the oxide semiconductor film in which defect levels in an energy gap due to oxygen deficiency are reduced by sufficient supply of oxygen and by sufficient reduction of the hydrogen concentration, the carrier concentration is less than $1\times10^{12}$ /cm$^3$, preferably less than $1\times10^{11}$ /cm$^3$, more preferably less than $1.45\times10^{10}$ /cm$^3$. The oxide semiconductor film as such has been made into i-type (intrinsic) or substantially i-type.

The oxide semiconductor film has a sodium concentration of $5\times10^{16}$ atoms/cm$^3$ or less, preferably $1\times10^{16}$ atoms/cm$^3$ or less, and more preferably $1\times10^{15}$ atoms/cm$^3$ or less. The oxide semiconductor film has a lithium concentration of $5 \times 10^{15}$ atoms/cm$^3$ or less, preferably $1 \times 10^{15}$ atoms/cm$^3$ or less. The oxide semiconductor film has a potassium concentration of $5 \times 10^{15}$ atoms/cm$^3$ or less, preferably $1 \times 10^{15}$ atoms/cm$^3$ or less.

Lithium, sodium, an alkali metal, and an alkaline earth metal are adverse impurities for the oxide semiconductor and are better contained as little as possible. In particular, in the case where an insulating film being in contact with the oxide semiconductor is an oxide, sodium diffuses thereinto to become a sodium ion (Na$^+$). In addition, sodium cuts a bond between metal and oxygen or enters the bond in the oxide semiconductor. Therefore, in the case where the hydrogen concentration of the oxide semiconductor film is $5 \times 10^{19}$ atoms/cm$^3$ or less, particularly $5 \times 10^{18}$ atoms/cm$^3$ or less, it is preferable to set the sodium concentration, the lithium concentration, and the potassium concentration at the above values.

Note that the above hydrogen concentration, sodium concentration, lithium concentration, and potassium concentration of the oxide semiconductor film are measured by SIMS (secondary ion mass spectroscopy).

By the use of the oxide semiconductor film for the electrode 102 on the power receiving side, the electrode 102 on the power receiving side can function as a low pass filter (LPF). Therefore, the electrode 102 on the power receiving side can protect the power receiving device 10 from the noise or the electromagnetic wave existing in the atmosphere, whereby the electrostatic breakdown, malfunction, and the like of the power receiving device 10 can be prevented.

In this manner, the electrode 102 on the power receiving side has a function of cutting off the high frequency. Therefore, it is not necessary to provide a filter for blocking the high-frequency noise. As a result, the power receiving device 10 can be thinned and downsized as compared with that provided with the filter.

For example, electrostatic discharge (ESD) sometimes occurs in the power transmitting device 20 to make a noise with respect to the power receiving device 10. Here, since the power receiving device 10 can be protected from the electrostatic discharge by the electrode 102 on the power receiving side including the oxide semiconductor film, the electrostatic breakdown, malfunction, and the like of the power receiving device 10 can be prevented.

Further, the electromagnetic wave existing in the atmosphere includes, for example, a high-frequency component included in a signal generated from an electronic appliance disposed near the power receiving device 10. Here, since the electrode 102 on the power receiving side including the oxide semiconductor film can protect the power receiving device 10 from the signal generated from the electronic appliance, the electrostatic breakdown, malfunction, and the like of the power receiving device 10 can be prevented.

Note that a transparent oxide semiconductor film can be obtained by the use of an oxide such as an In—Ga—Zn-based oxide, an In—Sn-based oxide, an In—Sn—Zn-based oxide, an In—Al—Zn-based oxide, a Sn—Ga—Zn-based oxide, an Al—Ga—Zn-based oxide, a Sn—Al—Zn-based oxide, an In—Zn-based oxide, a Sn—Zn-based oxide, an Al—Zn-based oxide, indium oxide, tin oxide, or zinc oxide as a material.

Then, by the use of the transparent oxide semiconductor film for the electrode 102 on the power receiving side, the range of the charging mode of the power receiving device 10 can be expanded. For example, a display portion of an electronic appliance including an electric field coupling type wireless power feed system can be provided with the electrode 102 on the power receiving side of the power receiving device 10. In this case, the electronic appliance can be charged by approximating the display portion of the electronic appliance to the power transmitting device side.

The electric power converting portion 104 generates a direct-current voltage from an alternating-current voltage which is based on the region 150. For example, a rectifying circuit is used as the electric power converting portion 104.

The charge circuit 106 charges the battery 112 by the direct-current voltage generated by the electric power converting portion 104. Further, the direct-current voltage is supplied from the charge circuit 106 to the power supply circuit 108.

With the use of the direct-current voltage supplied from the charge circuit 106, the power supply circuit 108 generates a variety of voltages necessary for driving the load 110 and supplies the voltages to the load 110. For example, a high power supply potential Vdd is generated by adjusting so that the direct-current voltage generated by the electric power converting portion 104 becomes constant, and the high power supply potential Vdd is supplied to the load 110. Note that in the case where sufficient electric power cannot be supplied from the charge circuit 106, the high power supply potential Vdd may be generated by the supply of the electric power from the battery 112.

The load 110 includes circuits having a variety of functions which operate on the high power supply potential Vdd supplied from the power supply circuit 108.

The structure of the load 110 depends on the kind of the electronic appliance including the power receiving device 10. For example, in a mobile phone, a camera, or the like, a logic circuit, an amplifier circuit, a memory controller, or the like corresponds to the load 110. Further, in an IC card, an IC tag, or the like, a high-frequency circuit, a logic circuit, or the like corresponds to the load 110.

As the battery 112, a battery which can be charged and discharged repeatedly can be used. The battery 112 is charged in such a manner that the direct-current voltage generated by the electric power converting portion 104 is supplied and discharged in such a manner that the electric power stored in the battery 112 is supplied to the load 110 via the power supply circuit 108.

As the battery 112, for example, a battery having a sheet-like shape can be used. Specifically, a lithium battery can be given. Among the lithium batteries, the use of a lithium polymer battery, a lithium ion battery, a lithium secondary battery, or the like which includes a gel-form electrolyte makes the device smaller. Further, the following batteries that are chargeable and dischargeable may be used: a nickel-metal-hydride battery, a nickel-cadmium battery, an organic radical battery, a lead-acid battery, an air secondary battery, a nickel-zinc battery, and a silver-zinc battery. Alternatively, a capacitor may be used. As the capacitor, a stacked-layer ceramic capacitor or an electric double layer capacitor is given.

For the electrode 202 on the power transmitting side, a material functioning as an electrode can be used. For example, a transparent material such as indium tin oxide (ITO), indium zinc oxide, zinc oxide (ZnO), or tin oxide (SnO$_2$) can be used. Alternatively, a metal such as aluminum (Al), chromium (Cr), copper (Cu), tantalum (Ta), titanium (Ti), molybdenum (Mo), or tungsten (W), an alloy including any of the above, or the like can be used.

When the electrode 202 on the power transmitting side is a flexible electrode formed by the use of a thin film or the like, the application range can be expanded, for example the power transmitting device 20 is provided for a curved object, and the electrode 202 on the power transmitting side can be easily handled.

A transparent electrode can be used as the electrode 202 on the power transmitting side by using a material such as indium tin oxide (ITO), indium tin oxide including silicon oxide (ITSO), or indium zinc oxide (IZO) as the material functioning as the electrode.

Note that the area of the electrode 202 on the power transmitting side is preferably larger than the area of the electrode 102 on the power receiving side. By increasing the area of the electrode 202 on the power transmitting side, the area where the power transmitting device 20 can charge can be increased; therefore, the degree of freedom of locating the power receiving device 10 with respect to the power transmitting device 20 can be increased.

Here, the degree of freedom of locating does not refer to the degree of freedom in a direction (Z-direction) away from the power transmitting device 20 but refers to the degree of freedom of locating the power receiving device 10 over the electrode 202 on the power transmitting side of the power transmitting device 20 (XY-plane).

In the electromagnetic induction type power feed system or the electromagnetic field resonance power feed system, the alignment between the device on the transmitting side and the device on the receiving side needs to be strictly performed in order to ensure the supply of the electric power. In contrast to these power feed systems, the electric field coupling type power feed system does not need strict alignment as long as the power receiving device 10 is located in the region where the power transmitting device 20 can charge (in the position approximate to the electrode 202 on the power transmitting side, for example over the electrode 202 on the power transmitting side). Accordingly, the power receiving device 10 can easily charged.

Further, since one power transmitting device 20 can be used with respect to a plurality of power receiving devices 10 by increasing the area of the electrode 202 on the power transmitting side, a plurality of power receiving devices 10 can be charged at the same time by the use of one power transmitting device 20.

The oscillator 204 generates an alternating-current voltage. As the oscillator 204, for example, an alternating-current power supply is used. Further, an amplifier for amplifying a signal generated by the oscillator 204 may be provided between the electrode 202 on the power transmitting side and the oscillator 204.

A low power supply potential Vss is supplied to each of the wiring 114 and the wiring 206. Note that with respect to the high power supply potential Vdd, the low power supply potential Vss satisfies the relation Vss<Vdd. The low power supply potential can be set at, for example, GND, 0 V, or the like.

Note that although the structure elements are classified according to the function and shown as independent blocks in the structure of the wireless power feed system shown in FIG. 1, the actual structure elements are difficult to separate completely according to the function and the power feed system sometimes operates in such a manner that one structure element has a plurality of functions.

In the electric field coupling type wireless power feed system described as above in Embodiment 1, the electrode 102 on the power receiving side can function as a low pass filter (LPF) by using the oxide semiconductor film for the electrode 102 on the power receiving side. Therefore, since the electrode 102 on the power receiving side can protect the power receiving device 10 from the noise or the electromagnetic wave existing in the atmosphere, the electrostatic breakdown, malfunction, and the like of the power receiving device 10 can be prevented.

Further, since the electrode 102 on the power receiving side functions as the low pass filter (LPF), a filter for blocking the high-frequency noise is not necessary to be provided. As a result, the power receiving device 10 can be thinned and downsized as compared with that provided with the filter.

(Embodiment 2)

Figure 2:
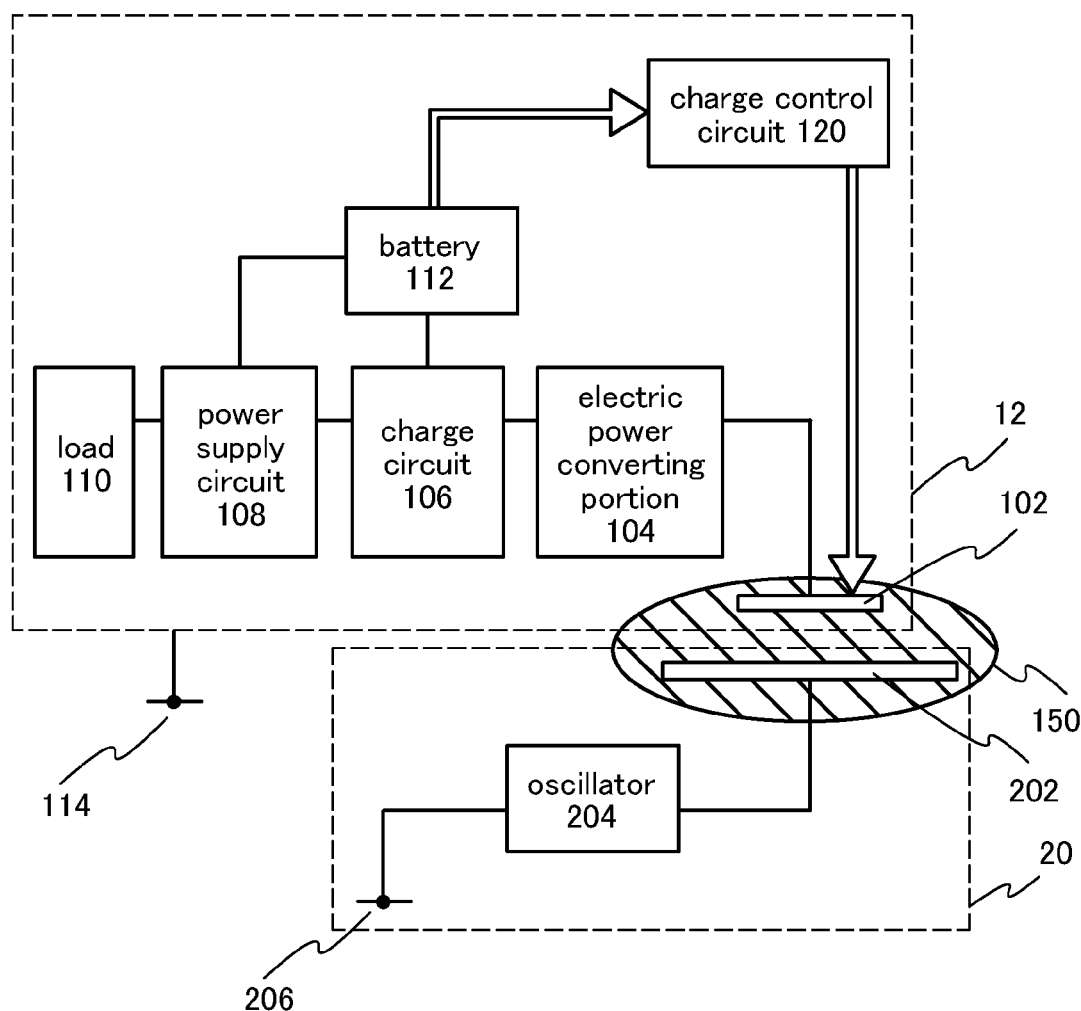
FIG. 2 is for explaining an example of a structure of an electric field coupling type wireless power feed system.

Embodiment 2 will describe an electric field coupling type wireless power feed system with reference to FIG. 2.

FIG. 2 shows an example of a structure of an electric field coupling type wireless power feed system. The power receiving device 12 in the wireless power feed system in FIG. 2 corresponds to the power receiving device 10 of the wireless power feed system in FIG. 1 provided with a charge control circuit 120.

The charge control circuit 120 controls charging/non-charging of the battery 112. In this specification, the stop of the charge corresponds to non-charge.

Here, the oxide semiconductor film used as the electrode 102 on the power receiving side is a film functioning as an insulator by the application of a positive direct-current voltage. Therefore, the charging of the battery 112 can be stopped by applying a positive direct-current voltage from the charge control circuit 120 to the electrode 102 on the power receiving side. Note that the positive direct-current voltage refers to a direct-current voltage having a positive potential based on the center potential of the alternating-current voltage applied to the electrode 202 on the power transmitting side.

In the case of charging the battery 112, the application of the positive direct-current voltage is stopped so as to make the oxide semiconductor film a film functioning as a conductor. Then, an electric field is formed between the electrode 102 on the power receiving side and the electrode 202 on the power transmitting side, so that charging of the battery 112 can be performed by supplying the electric power from the power transmitting device 20 to the power receiving device 10.

In this manner, the charging/non-charging of the power receiving device 12 can be easily controlled by whether or not the positive direct-current voltage is applied to the electrode 102 on the power receiving side including the oxide semiconductor film.

In the case where it is not necessary to charge the battery 112, the oxide semiconductor film included in the electrode 102 on the power receiving side is made a film functioning as an insulator by the charge control circuit 120, so that the leakage of the electric power stored in the battery 112 can be prevented.

The charge control circuit 120 may have a function of monitoring a charging condition of the battery 112. For example, the charge control circuit 120 can monitor the voltage value of the battery.

When the voltage value of the battery 112 is lower than a predetermined value, the battery 112 is charged by the charge control circuit 120. When the voltage value of the battery 112 is the predetermined value or more, the charging of the battery 112 is stopped by the charge control circuit 120.

By using the charge control circuit 120 to control the charging/non-charging of the battery 112 in accordance with the charging condition of the battery 112 in this manner, overcharging of the battery 112 when the battery 112 is charged can be prevented.

When one power transmitting device 20 is used with respect to a plurality of power receiving devices 12, the plural power receiving devices 12 can be charged at the same time using one power transmitting device 20. Here, the charging of some of the plural power receiving devices 12 which are not necessary to be charged can be stopped individually. Therefore, the power can be efficiently fed to the power receiving device which is necessary to be charged.

As described above, in the electric field coupling type wireless power feed system described in Embodiment 2, the positive direct-current voltage is applied to the electrode 102 on the power receiving side including the oxide semiconductor film to make the oxide semiconductor film a film functioning as an insulator, whereby the charging of the battery 112 can be stopped. This allows easy control of the charging/non-charging of the battery 112.

(Embodiment 3)

With reference to FIGS. 3A to 3F and FIG. 4, Embodiment 3 will describe electronic appliances each including the power receiving device or the power transmitting device used in the electric field coupling type wireless power feed system described in Embodiment 1 and Embodiment 2.

As the electronic appliance including the power receiving device, a mobile phone, a portable information terminal (such as a portable computer, a portable game machine, or an electronic book), a camera (such as a digital video camera or a digital camera), a computer, an image reproduction device provided with a recording medium (specifically, a device which plays a recording medium such as a DVD (digital versatile disc) and which has a display portion for displaying the image), an IC card, an IC tag, or the like is given. Examples of the electronic appliances including the power receiving devices are explained with reference to FIGS. 3A to 3F.

Figure 3A:
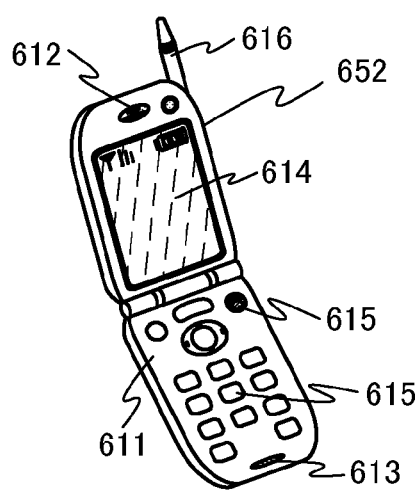
FIGS. 3A to 3F are each for explaining an example of an electronic appliance having a power receiving device.
Figure 3B:
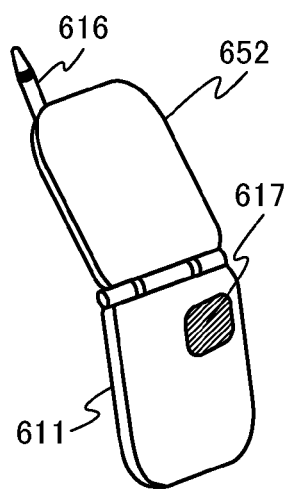

FIGS. 3A and 3B show an example of a mobile phone 652. FIG. 3B shows the rear side of the mobile phone 652 shown in FIG. 3A. The mobile phone 652 includes a main body 611, an audio output portion 612, an audio input portion 613, a display portion 614, operation keys 615, an antenna 616, an electrode 617, and the like. Further, the main body 611 incorporates a battery.

An electronic component such as the audio output portion 612, the audio input portion 613, the display portion 614, or the operation keys 615 corresponds to the load of the power receiving device explained in Embodiment 1 and Embodiment 2. The electrode 617 corresponds to the electrode on the power receiving side of the power receiving device.

An electric field is generated between the electrode 617 and the electrode on the power transmitting side by approximating the mobile phone 652 to the power transmitting device including the electrode on the power transmitting side, so that the electric power can be supplied from the power transmitting device to the mobile phone 652. Here, by the use of an oxide semiconductor film for the electrode 617, the mobile phone 652 which is unlikely affected by the noise and which has a reduced size can be obtained.

Figure 3C:
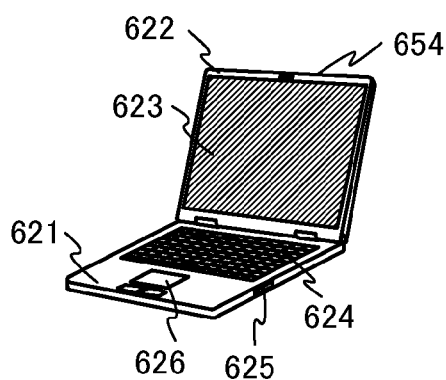
Figure 3D:
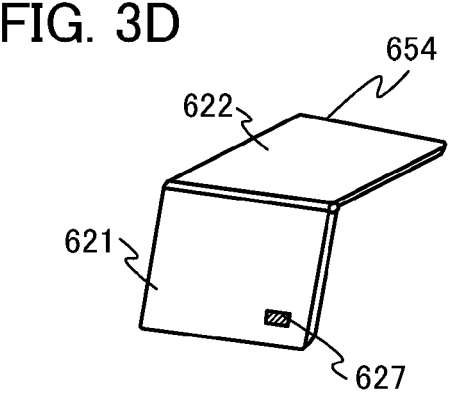

FIGS. 3C and 3D show an example of a portable computer 654 (also called "laptop computer"). Note that FIG. 3D shows the rear side of the portable computer 654 shown in FIG. 3C. The portable computer 654 includes a main body 621, a housing 622, a display portion 623, a keyboard 624, an external connection port 625, a pointing device 626, an electrode 627, and the like. The main body 621 incorporates a battery.

An electronic component such as the display portion 623, the keyboard 624, the external connection port 625, or the pointing device 626 corresponds to the load of the power receiving device explained in Embodiment 1 and Embodiment 2. Further, the electrode 627 corresponds to the electrode on the power receiving side included in the power receiving device.

An electric field is generated between the electrode 627 and the electrode on the power transmitting side by approximating the portable computer 654 to the power transmitting device including the electrode on the power transmitting side, so that the electric power can be supplied from the power transmitting device to the portable computer 654. Here, by the use of an oxide semiconductor film for the electrode 627, the portable computer 654 which is unlikely affected by the noise and which has a reduced size can be obtained.

Note that when the main body 621 is provided with the electrode 627 in FIG. 3D, the portable computer 654 can be operated while being charged. Alternatively, the housing 622 may be provided with the electrode 627.

Figure 3E:
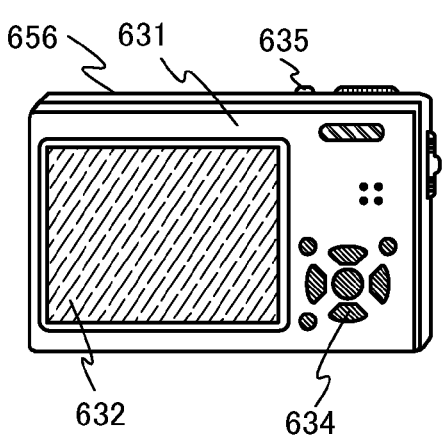
Figure 3F:
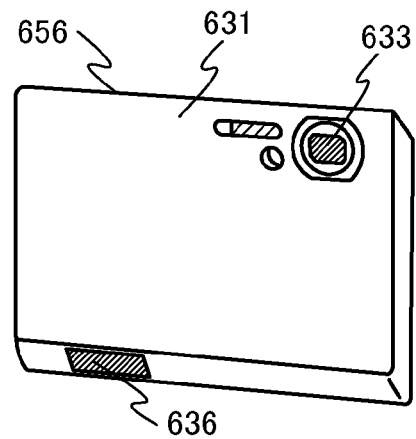

FIGS. 3E and 3F show an example of a digital camera 656. Note that FIG. 3F shows the rear side of the digital camera 656 in FIG. 3E. The digital camera 656 includes a housing 631, a display portion 632, a lens 633, operation keys 634, an operation key 635, an electrode 636, and the like. The housing 631 incorporates a battery.

The display portion 632 may function as a display medium such as a television receiver by providing the digital camera 656 with an antenna or the like to receive signals such as a video signal and an audio signal with the antenna.

An electronic component such as the display portion 632, the operation keys 634, or the operation key 635 corresponds to the load of the power receiving device explained in Embodiment 1 and Embodiment 2. Further, the electrode 636 corresponds to the electrode on the power receiving side included in the power receiving device.

An electric field is generated between the electrode 636 and the electrode on the power transmitting side by approximating the digital camera 656 to the power transmitting device including the electrode on the power transmitting side, so that the electric power can be supplied from the power transmitting device to the digital camera 656. Here, by the use of an oxide semiconductor film for the electrode 636, the digital camera 656 which is unlikely affected by the noise and which has a reduced size can be obtained.

Next, an example of the electronic appliance including the power transmitting device is explained with reference to FIG. 4. As the electronic appliance including the power transmitting device, for example, an appliance with a sheet-like shape such as a charger sheet or a tablecloth is given. Other than those above, a piece of furniture such as a table or a shelf or a part of a building such as a floor or a wall may incorporate the power transmitting device.

Figure 4:
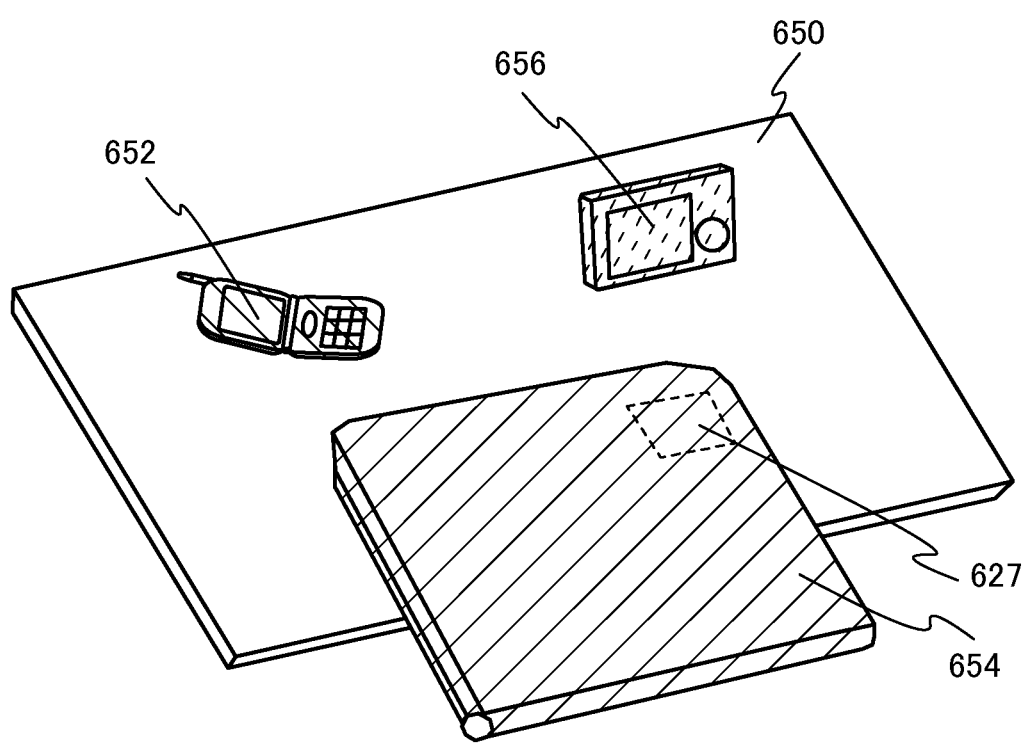
FIG. 4 is for explaining an example of an electronic appliance having a power transmitting device.
Figure 5:
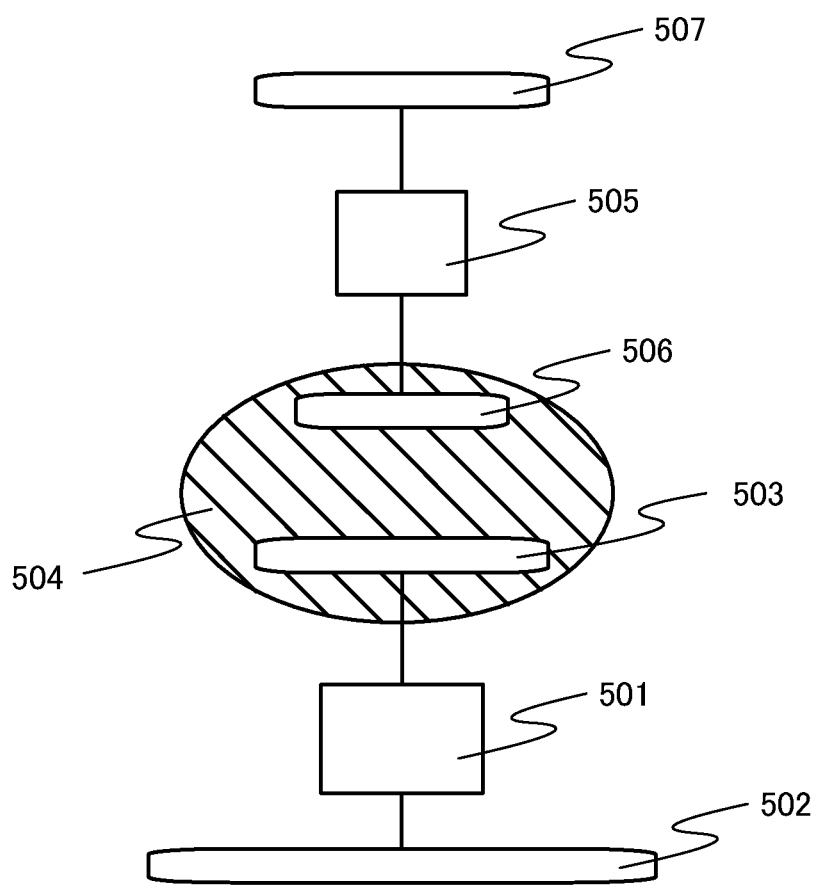
FIG. 5 is for explaining an example of a structure of an electric field coupling type wireless power feed system.

In FIG. 4, the electronic appliance having the power receiving device is charged using a charger sheet 650. The charger sheet 650 incorporates the power transmitting device described in Embodiment 1 and Embodiment 2.

Further, the mobile phone 652, the portable computer 654, and the digital camera 656 are shown as the electronic appliances having the power receiving devices in FIG. 4. The mobile phone 652 and the like are examples of the electronic appliances having the power receiving devices and the present invention is not limited thereto.

The mobile phone 652, the portable computer 654, and the digital camera 656, which are located over the charger sheet 650, can be charged at the same time. Note that all the electronic appliances having the power receiving devices are not necessarily charged at the same time. For example, as described in Embodiment 2, the charging/non-charging of each of the plural electronic appliances including the power receiving devices may be controlled by a charge control circuit; among the plural appliances located over the charger sheet 650, there may be some electronic appliances including the power receiving devices which are not charged.

In the case of providing the entire surface of the charger sheet 650 with the electrode on the power transmitting side, the electric power can be supplied from the charger sheet 650 to the electronic appliance having the power receiving device by approximating the electrode on the power receiving side of the electronic appliance including the power receiving device to at least a part of the charger sheet 650. For example, the electric power is supplied from the charger sheet 650 to the portable computer 654 by approximating the electrode 627 provided for the portable computer 654 in FIG. 4 to the charger sheet 650.

In this manner, when the electronic appliance including the power receiving device is charged by providing the entire surface of the charger sheet 650 with the electrode on the power transmitting side, the electrode on the power receiving side may be approximated to the charger sheet 650. Accordingly, the degree of freedom in locating the electronic appliance including the power receiving device with respect to the charger sheet 650 can be increased. For example, it is not necessary to locate the entire portable computer 654 over the charger sheet 650 as long as the electrode 627 is located over the charger sheet 650 as shown in FIG. 4.

Note that at least any one region of the charger sheet 650 may be provided with the electrode on the power transmitting side instead of providing the entire surface of the charger sheet 650 with the electrode on the power transmitting side. In this case, the electronic appliance including the power receiving device is located so that the any region and the electrode on the power receiving side of the electronic appliance including the power receiving device are approximated to each other, whereby the electric power can be supplied from the charger sheet 650 to the electronic appliance including the power receiving device.

In this manner, by providing any region of the charger sheet 650 with the electrode on the power transmitting side, the electric power can be efficiently supplied from the charger sheet 650 to the electronic appliance including the power receiving device. Moreover, since the area of the electrode on the power transmitting side can be reduced, the power consumption of the charger sheet 650 can be reduced.

EXAMPLE 1

With reference to FIGS. 6A and 6B and FIGS. 7A and 7B, Example 1 will describe the results of measuring the frequency characteristic of the capacitance value and the C-V characteristic using test evaluation groups (also called TEGs).

As the test evaluation groups, TEG-1 and TEG-2 were used.

TEG-1 corresponds to the wireless power feed system described in the above Embodiment. In TEG-1, an oxide semiconductor layer was formed over a gate electrode with a gate insulating film interposed therebetween. In TEG-1, a capacitance is formed by the gate electrode and the oxide semiconductor layer. Then, a metal layer was formed in contact with the oxide semiconductor layer.

In TEG-1, a tungsten (W) layer with a thickness of 100 nm was used as the gate electrode and a silicon oxynitride film with a thickness of 100 nm was used as the gate insulating film. Further, an oxide including zinc oxide (IGZO: indium gallium zinc oxide) film with a thickness of 25 nm and an area of 1000 μm×1000 μm was used as the oxide semiconductor layer. Further, a stacked-layer structure in which an aluminum (Al) layer was provided over a titanium (Ti) layer was used as the metal layer.

TEG-2 was manufactured in order to compare with TEG-1. In TEG-2, a semiconductor layer was formed over a gate electrode with a gate insulating film interposed therebetween, and a metal layer was formed over the semiconductor layer. In TEG-2, a capacitance is formed by the gate electrode, the semiconductor layer, and the metal layer.

In TEG-2, a tungsten (W) layer with a thickness of 100 nm was used as the gate electrode and a silicon oxynitride film with a thickness of 300 nm was used as the gate insulating film. Further, the semiconductor layer was formed by forming a microcrystalline semiconductor film with a thickness of 25 nm and then adding phosphorus (P) as an impurity element imparting one conductivity type to a region near the surface thereof. The semiconductor layer had an area of 1000 μm×1000 μm. Further, a stacked-layer structure in which an aluminum (Al) layer was provided over a titanium (Ti) layer was used as the metal layer.

<Frequency Characteristic of Capacitance Value>

In an evaluation method of the frequency characteristic of the capacitance value, the capacitance C (unit: pF) when the frequency f (unit: Hz) of the alternating-current voltage applied to TEG-1 and TEG-2 was varied between 60 Hz and 1 MHz was measured. Here, as for the measurement condition, the direct-current voltage applied to each of the metal layers of TEG-1 and TEG-2 was varied between −30 V and 5 V.

Figure 6A:
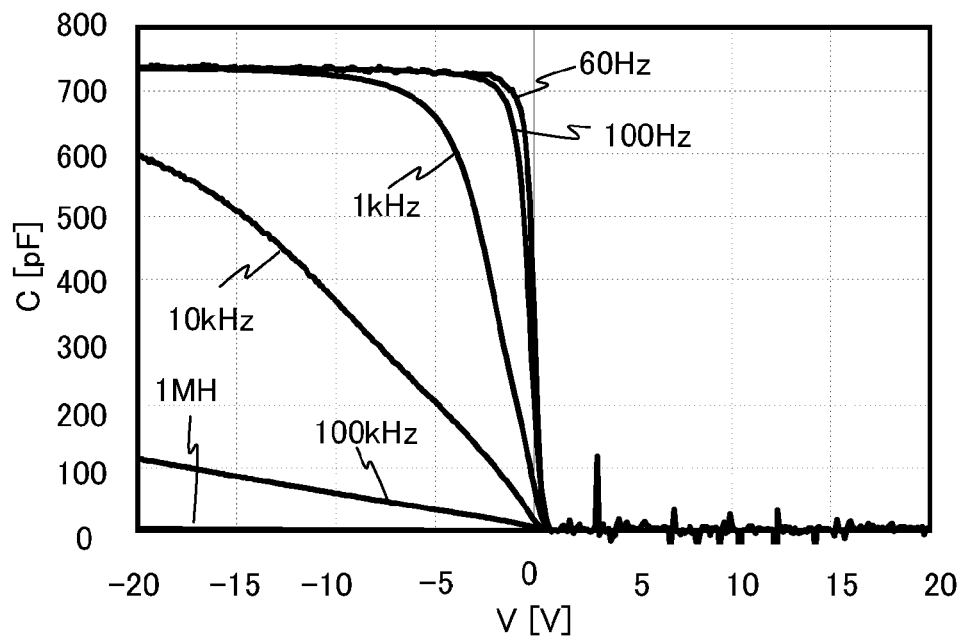
FIGS. 6A and 6B are for explaining results of measuring the frequency characteristic of a capacitance value.

The results of measuring the frequency characteristic of the capacitance value are hereinafter described. FIG. 6A shows the measurement results of TEG-1 and FIG. 6B shows the measurement results of TEG-2.

As shown in FIG. 6A, in TEG-1, when the frequency f exceeded a certain value, the capacitance C decreased. It was confirmed that when the frequency f was as high as 1 MHz, TEG-1 hardly functioned as a capacitor.

Note that it was confirmed that the frequency f depended on the value of the direct-current voltage applied to the gate electrode. It was considered that in FIG. 6A, the direct-current voltage needed to be −5 V or less in order for TEG-1 to function as a capacitor. Note that the value of the direct-current voltage necessary for TEG to function as a capacitor depends on the characteristic of the oxide semiconductor layer.

Figure 6B:
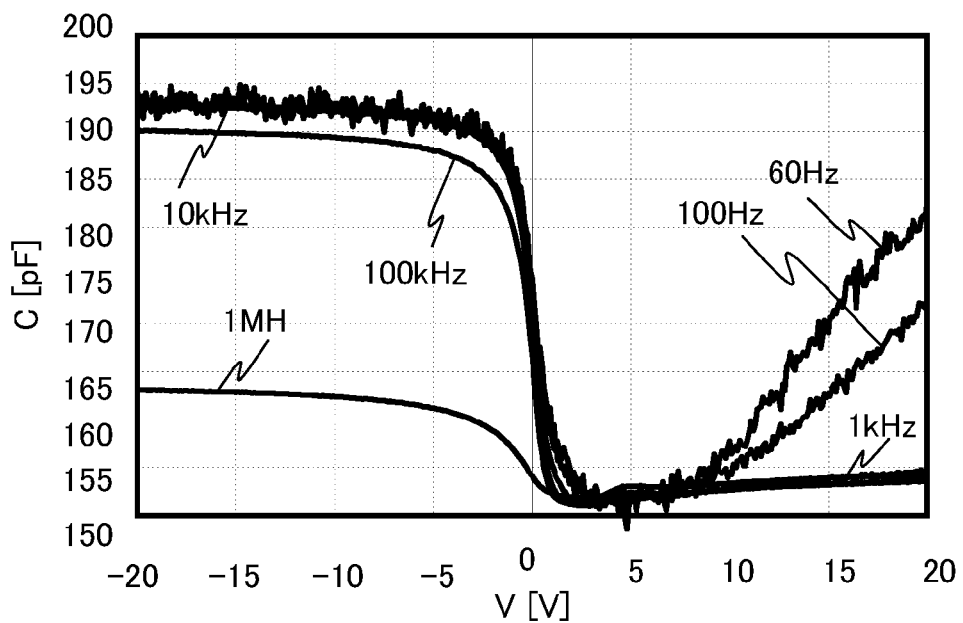

On the other hand, as shown in FIG. 6B, it was confirmed that TEG-2 functioned as a capacitor even when the frequency f was as high as 1 MHz.

Thus, it was confirmed that TEG-1 corresponding to the wireless power feed system described in Embodiments 1 and 2 did not function as a capacitor when the frequency of the alternating-current voltage to be applied became a high frequency. Accordingly, it was confirmed that the oxide semiconductor layer functioned as a low pass filter (LPF) for cutting off the high frequency by the use of the oxide semiconductor layer for the electrode.

<C-V Characteristic>

In an evaluation method of the C-V characteristic, the capacitance C (unit: pF) when the direct-current voltage (unit: V) to be applied to each of the gate electrodes of TEG-1 and TEG-2 was varied between −20 V and 20 V was measured. Here, as for the measurement condition, the frequency of the alternating-current voltage applied to TEG-1 and TEG-2 was varied between 60 Hz and 1 MHz.

Figure 7A:
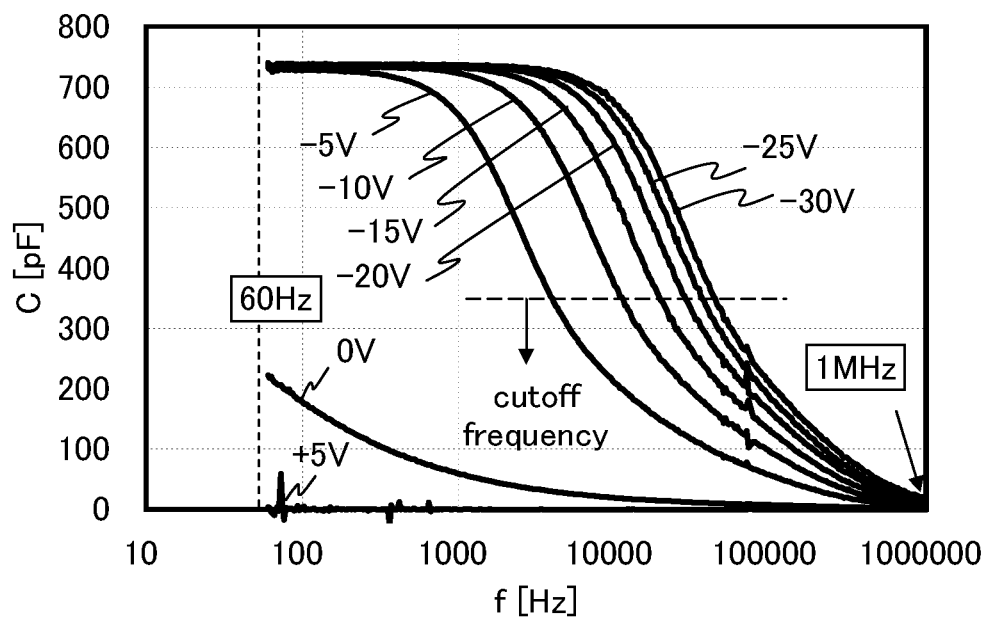
FIGS. 7A and 7B are for explaining results of measuring the C-V characteristic.

The results of measuring the C-V characteristic are hereinafter described. FIG. 7A shows the measurement results of TEG-1 and FIG. 7B shows the measurement results of TEG-2.

As shown in FIG. 7A, it was confirmed that TEG-1 did not have a function as a capacitor when a positive direct-current voltage was applied to the gate electrode. It was considered that this was because the application of the positive direct-current voltage led to disappearance of carriers accumulated in the oxide semiconductor layer used as the electrode so that the oxide semiconductor layer became a film functioning as an insulator.

Figure 7B:
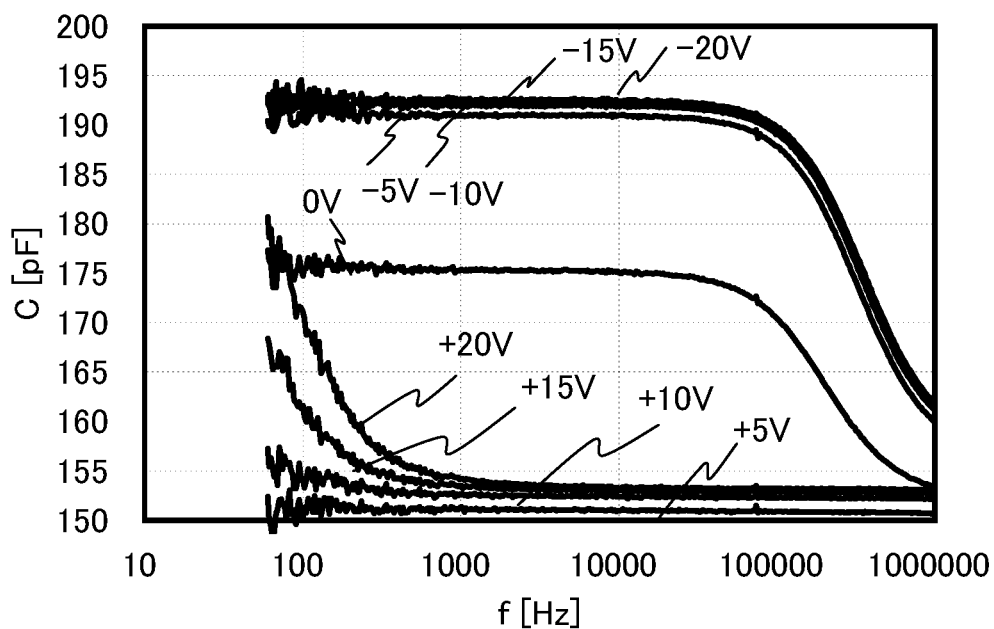

On the other hand, as shown in FIG. 7B, it was confirmed that TEG-2 functioned as a capacitor even when the positive direct-current voltage was applied.

In this manner, it was confirmed that TEG-1 corresponding to the wireless power feed system described in Embodiments 1 and 2 did not function as a capacitor when the positive direct-current voltage was applied. Accordingly, it was confirmed that by the use of the oxide semiconductor layer for the electrode, the oxide semiconductor layer was able to serve as a film functioning as an insulator when the direct-current voltage was applied.

This application is based on Japanese Patent Application serial no. 2010-203874 filed with Japan Patent Office on Sep. 13, 2010, the entire contents of which are hereby incorporated by reference.

What is claimed is:

1. A power receiving device comprising:
   a first electrode consisting of an oxide semiconductor film;
   a battery; and
   a charge control circuit,
   wherein the battery is charged by a voltage generated based on an electric field generated between the first electrode and a second electrode of a power transmitting device, and
   wherein the charging of the battery is stopped by applying a positive direct-current voltage from the charge control circuit to the first electrode.

2. The power receiving device according to claim 1,
   wherein the oxide semiconductor film has a sodium concentration of $5\times10^{16}$ atoms/cm$^3$ or less.

3. The power receiving device according to claim 1,
   wherein the oxide semiconductor film has a hydrogen concentration of $5\times10^{19}$ atoms/cm$^3$ or less.

4. The power receiving device according to claim 1,
   wherein the battery comprises a lithium battery, a nickel-metal-hydride battery, a nickel-cadmium battery, an organic radical battery, a lead-acid battery, an air secondary battery, a nickel-zinc battery, a silver-zinc battery, or a capacitor.

5. An electronic appliance comprising the power receiving device according to claim 1,
   wherein the electronic appliance is a mobile phone, a portable information terminal, a camera, a computer, an image reproduction device, an IC card, or an IC tag.

6. A capacitive coupling type wireless power feed system comprising:
   a power receiving device including a first electrode consisting of an oxide semiconductor film, a battery, and a charge control circuit; and
   a power transmitting device including a second electrode,
   wherein the battery is charged by a voltage generated based on an electric field generated between the first electrode and the second electrode, and
   wherein the charging of the battery is stopped by applying a positive direct-current voltage from the charge control circuit to the first electrode.

7. The capacitive coupling type wireless power feed system according to claim 6,
   wherein the oxide semiconductor film has a sodium concentration of $5\times10^{16}$ atoms/cm$^3$ or less.

8. The capacitive coupling type wireless power feed system according to claim 6,
   wherein the oxide semiconductor film has a hydrogen concentration of $5\times10^{19}$ atoms/cm$^3$ or less.

9. The capacitive coupling type wireless power feed system according to claim 6,
   wherein the battery comprises a lithium battery, a nickel-metal-hydride battery, a nickel-cadmium battery, an organic radical battery, a lead-acid battery, an air secondary battery, a nickel-zinc battery, a silver-zinc battery, or a capacitor.

10. The capacitive coupling type wireless power feed system according to claim 6,
    wherein the power receiving device is provided for a mobile phone, a portable information terminal, a camera, a computer, an image reproduction device, an IC card, or an IC tag.

11. The capacitive coupling type wireless power feed system according to claim 6,
    wherein the power transmitting device is provided for a charger sheet.

* * * * *